Figure 1:
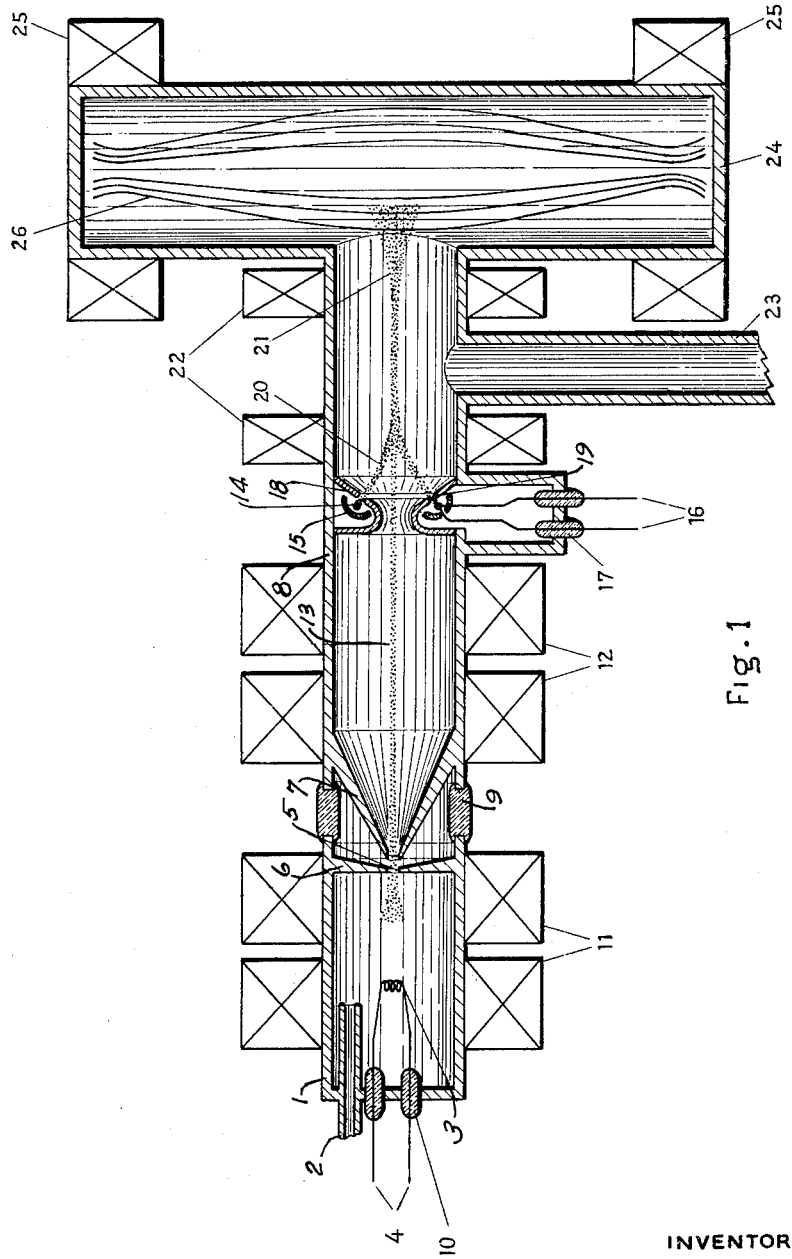

United States Patent Office 3,212,974
Patented Oct. 19, 1965

3,212,974
PARTICLE INJECTING DEVICE
Hubert Leboutet and R. Georges Dube, Paris, France, assignors to Compagnie Generale de Telegraphie Sans Fil, Paris, France
Filed May 31, 1960, Ser. No. 33,004
15 Claims. (Cl. 176—5)

The present invention relates to devices adapted to be used in the art of thermonuclear fusion, in which the gaseous plasma, that is an electrically neutral gas containing the ions of a light element mixed with electrons in such quantity that the total charge thereof compensates that of the ions, is confined at the interior of the device to prevent energy losses by contact or impact on the walls by the particles which are heated by mutual impacts up to the temperatures at which the probability of a thermonuclear fusion reaction becomes significant. More particularly, the present invention relates to plasma injection systems for injecting the plasma into such devices.

The injection problem in these devices is one of the most difficult ones in this art and heretofore has never received any satisfactory solutions. It has been attempted to inject separately the ions and the electrons into the confining device and to form a mixture thereof at the interior of the confining device. However, it is difficult for the charged particles which the ions and the electrons are in fact, to traverse easily the walls of the so-called "magnetic bottles" which are generally utilized for the confinement, in the presence of the space charge created by these very same particles, and which opposes the movement thereof in the desired direction.

It has also been attempted to form the plasma prior to injection thereof, starting with a titanium source on which is adsorbed gaseous deuterium, and which is subjected to a sudden heating giving rise to an emission of plasma. This system, however, entails the inconvenience and disadvantage that the ions leave the source at a relatively low energy level, and therefore require more time for acquiring a sufficiently high kinetic energy necessary in order that the plasma becomes hot. In all of these cases, the heating time of the plasma up to the thermonuclear temperatures is extended and risks to become longer than the time during which it is possible to maintain the confinement which compromises the chances of production of a fusion reaction.

The injection system which forms the object of the present invention eliminates these shortcomings of the prior art devices in an effective and simple manner. The injection system according to the present invention essentially comprises means for mixing, prior to the admission within the confining device, the high energy ions with the electrons. The latter may be at relatively weak energy which factor is without significance for the purpose at which the present invention aims, the energy and corresponding temperature of the ions being the only factor which matters.

According to one embodiment of the present invention, a beam of high energy ions and a coaxial beam of electrons are formed whereby one of these beams is passed through the inside of the other, and at least one of these beams is deflected or deviated by directing the same against the other in such a manner that the two types of particles mix intimately.

According to one preferred embodiment of the present invention, the ion beam passes along the inside of the tubular electron beam.

Such a system admits of two boundary variations depending on whether the electron beam converges toward the ion beam, or the ion beam diverges toward the electron beam. However, other intermediate variations lying between these two boundary variations are also within the spirit and scope of the present invention according to which the two beams are deflected toward each other to greater or lesser degrees respectively.

Accordingly, it is an object of the present invention to provide a plasma injection system which obviates the inadequacies and shortcomings of the prior art devices in an effective and simple manner.

It is another object of the present invention to provide a plasma injection device in which ions having relatively high kinetic energies are mixed with the electrons.

Still a further object of the present invention is the provision of an injection system for injecting a plasma into a confining device which not only assures intimate mixing of the particles constituting the plasma, but also permits the injection in a simple manner across the walls of the confining device.

A further object of the present invention is the provision of a plasma injecting device which permits a simple and efficient injection of the plasma particles across a so-called magnetic bottle normally utilized for confining the plasma within a predetermined space.

Figure 2:
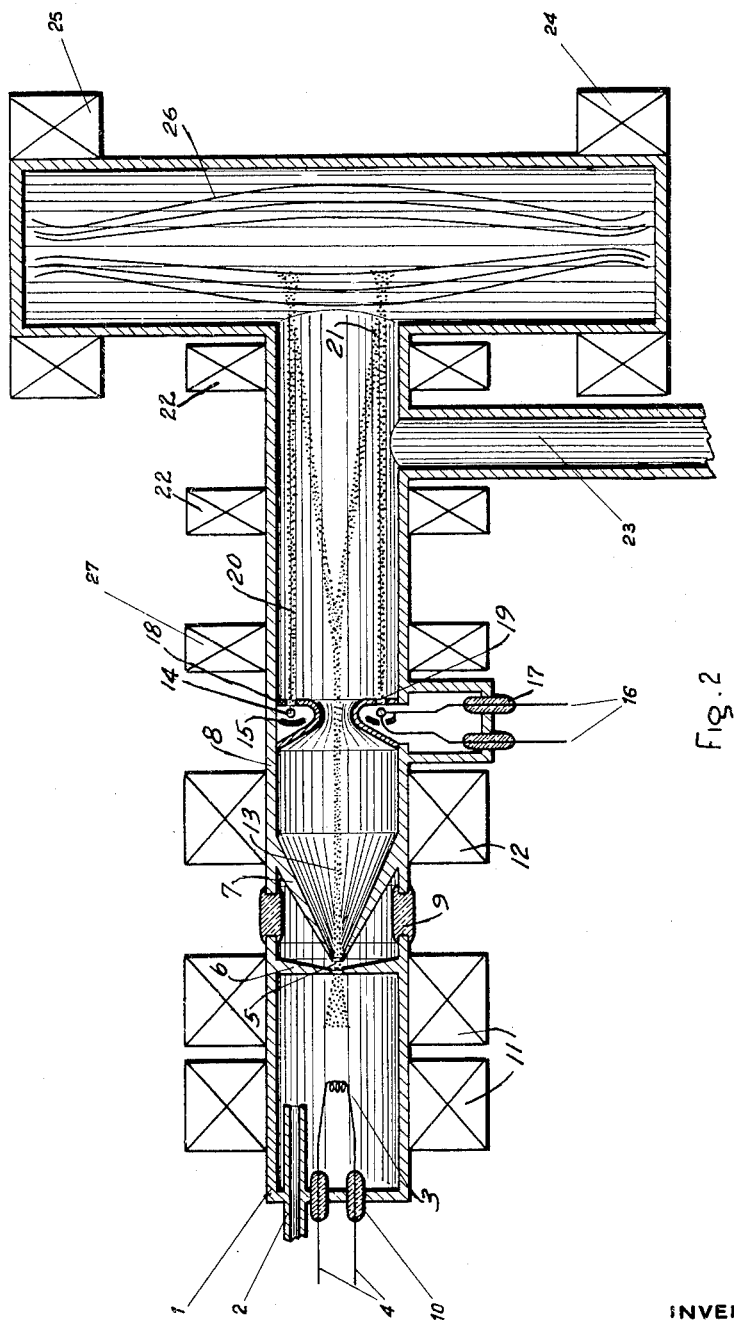

These and other objects, features and advantages of the present invention will become more obvious from the following description when taken in connection with the accompanying drawing which shows, for purposes of illustration only, two embodiments in accordance with the present invention and wherein:

FIGURE 1 is an axial longitudinal cross-sectional view through a first embodiment of a plasma injection system according to the present invention in which the electron beam converges toward the ion beam, and FIGURE 2 is an axial longitudinal cross-sectional view through a modified embodiment of an injection system in accordance with the present invention in which the ion beam diverges toward the electron beam.

Referring now to the drawing wherein like reference numerals are used throughout the two views to designate corresponding parts, and more particularly to FIGURE 1, which illustrates a longitudinal cross-sectional view through a first embodiment in accordance with the present invention, reference numeral 1 designates therein an enclosure or vessel into which a gas such as deuterium is admitted through the inlet pipe or orifice 2. At the left end of the enclosure or vessel 1 there is disposed an ion gun of conventional, classic construction which includes a cathode 3 supplied with current over conductors 4 from a suitable source of electric power (not illustrated). The cathode 3 in the presence of the gaseous medium thereby functions as a source of ionizing electrons. The ionized gas produced thereby escapes in the form of a beam through the aperture 5 provided in diaphragm 6 and passes across an extraction electrode 7 of conical shape which is mounted on the injector body 8. The injector body 8 is insulated from the enclosure or vessel 1 by means of an insulating ring 9 of any suitable material, and suitable potentials are applied from any appropriate sources (not illustrated) in such a manner that the enclosure 1 and the diaphragm 6 are very positive with respect to the body 8 and the extraction electrode 7. From the start thereof, the ion beam is therefore at a very high energy. The cathode 3, in its turn, is carried at a negative potential with respect to the enclosure 1 which is possible thanks to the insulating passages or beads 10 through which pass the conductors 4. In this manner, the diaphragm 6 operates as accelerator anode for the electrons of the source 3. The magnetic windings 11 and 12 focus the ion beam 13 which propagates along the axis of the injection system.

According to the present invention, the high energy ion beam is passed through the inside of a tubular electron beam which is made to converge in such a manner that the electrons mix with the ions in the neighborhood of the axis of the injector and form a high energy plasma prior to injection thereof into the utilization vessel or enclosure. This electron beam is furnished from a gun comprising an annular cathode 14 which is coaxially arranged with respect to the ion beam 13, and a Wehnelt electrode 15 also of annular shape. The cathode 14 is supplied from a suitable source (not illustrated) by means of conductors 16 passing through the passages or beads 17. Suitable bias of the cathode 14 and of the Wehnelt electrode 15 with respect to the body 8 are assured by appropriate voltage sources (not illustrated). The cathode and Wehnelt assembly is surrounded by a screen made of soft iron 18 which operates as anode for the electron gun, and of which the role is, on the one hand, to protect the region of the cathode against the magnetic field of the focusing windings 12 for the ions and, on the other, to determine a distribution of the lines of force of the magnetic focusing field of the electrons such that the electrons, passing through an annular slot 19 in the screen 18, follow convergent and curved trajectories or paths 20 in order to mix within the axis of the device with the ion beam 13 and to form thereby the plasma beam 21. For that purpose, the surface within which is provided the slot 19 is conical, and the Wehnelt electrode 15 is directed in such a way that the electrons leave the electron gun essentially perpendicularly to this conical surface. The magnetic focusing field for the electrons is furnished by windings 22, and the intensity thereof, stronger than that of the windings 11 and 12, is chosen to obtain the desired paths 20, taking into consideration the deformation of the distribution introduced by the screen 18. The accelerating voltage of the electron gun is preferably such that the speed of the electrons of the beam 20 is of the same order of magnitude as that of the ion beam 13. The accelerating voltage is therefore very much lower than the accelerating voltage for the ions, taking into consideration the difference in mass between the ions and the electrons. Nevertheless, care should be taken to avoid that the two velocities are exactly in synchronism, i.e., that the respective energies of ions and electrons are exactly in the proportion of the masses, for the recombination of ions and electrons into atoms of the gas would then be favored, to the detriment of the pure plasma state.

The injector body 8 is in communication, on the one hand, with a pumping conduit 23, and on the other hand, with a plasma confining device 24, for example, with an enclosure or vessel in the form of a cylinder of which the ends thereof are surrounded by windings 25 forming magnetic mirrors and producing at the inside of the cylinder a pattern of lines of force 26 in the form of a magnetic bottle. As one illustrative example, there has been represented a transverse injection of the plasma 21 across the walls of the bottle 26 which is possible with the system according to the present invention thanks to the high energy of the injected plasma and to its electrically neutral state.

The operation of the confining device does not require any detailed explanation since the same is generally known per se. It suffices to remind that the plasma, injected in the form of an organized beam, is not yet "hot" in the thermodynamic sense, notwithstanding the high kinetic energy but that the heating thereof increases to the extent of the disorganization of the beam by collisions between ions within the interior of the magnetic bottle which confines the plasma within the region insulated from the walls of the vessel and thereby prevents energy losses by cooling. With the injection system according to the present invention, the heating time up to thermonuclear temperatures is susceptible to become shorter than the confining time which places the device into conditions favorable to thermonuclear fusion.

The modification of FIGURE 2 differs from that of FIGURE 1 only by the fact that instead of the electron beam which converges to mix with the ions in the axis thereof, it is the ion beam which diverges to mix with the electron beam which remains essentially of tubular cylindrical shape. The general structure is otherwise the same as that of FIGURE 1 and the same reference numerals have been utilized to designate corresponding parts. Only the surface in which is provided the slot 19 is no longer conical but is plane, and the Wehnelt electrode 15 is disposed in such a manner that the beam 20 is of tubular cylindrical shape, coaxial with the beam 13. The member 18 no longer needs to be of magnetic material. Additionally, an auxiliary winding 27 is disposed between the windings 22 and 12 which produces a weaker magnetic field than that of the windings 11 and 12. The effect of this auxiliary winding 27 is to diverge the beam 13 and to affect the beam 20 only insignificantly, i.e., to deviate the beam 20 only very slightly, if at all, in such a manner that the beam of the plasma 21 presents a tubular form at the input to the enclosure 24. The functioning of the device of the embodiment of FIGURE 2 is otherwise the same as that of FIGURE 1.

While we have shown and described two embodiments in accordance with the present invention, it is understood that the present invention is not limited thereto, but is susceptible of many changes and modifications within the spirit and scope of the present invention. In particular, a person skilled in the art may readily visualize inverse realizations in which the electron beam, for example, passes through the inside of the ion beam whereby either the electron beam diverges or, in contrast thereto, the ion beam converges toward the axis of the injection device. In all of the these cases, the result aimed at will be obtained since a plasma beam of high energy is formed prior to the injection thereof into the confining devices.

Thus, it is quite clear, that the present invention is not limited to the particular embodiments shown and described herein, but is susceptible of many changes and modifications within the spirit and scope of the present invention, and we, therefore, do not wish to be limited to the details shown and described herein, but intend to cover all such changes and modifications as are encompassed by the scope of the appended claims.

We claim:

1. A particle confining device comprising an evacuated vessel, means for generating a beam of ions having high energy, means for generating an electron beam substantially coaxial with the beam of ions, means for mixing said ion beam with said electron beam outside of said vessel to form plasma, means for injecting said plasma into said vessel, and means for confining said plasma within said vessel.

2. A device as claimed in claim 1, further comprising means for forming a magnetic bottle inside of said vessel, said injecting means being operative to inject plasma through the walls of said bottle.

3. A particle-confining device comprising an evacuated vessel, means including first focusing mens for generating a beam of ions having high energy and concentrating the ions within said first-mentioned beam, means including second focusing means for generating an electron beam and concentrating the electrons in said second-mentioned beam essentially coaxial to said first-mentioned beam, means for mixing said ion beam with said electron beam outside of said vessel of form a plasma including deflecting means for at least one of said first-mentioned and second-mentioned beams to direct the same toward the other of said beams to thereby mix the particles of both beams, means for injecting said plasma into said vessel, and means for confining said plasma within said vessel.

4. A device as claimed in claim 3, wherein said first beam is located interiorly essentially in the axis of said second beam.

5. A device as claimed in claim 4, wherein said deflecting means are operative to converge said second beam, whereby electrons of said second beam are deflected toward the ions of said first beam.

6. A device as claimed in claim 4, wherein said deflecting means are operative to diverge said first beam, whereby ions of said first beam are deflected toward the electrons of said second beam.

7. A device as claimed in claim 3, wherein said first focusing means is formed by magnetic field generating means producing lines of force essentially directed in the desired direction of said first beam, and further comprising shielding means for protecting said electron flow against said magnetic field effect of said first focusing means.

8. A device as claimed in claim 7, wherein said electron beam generating means is substantially enclosed within a shield made of soft iron.

9. A device as claimed in claim 8, wherein said shield has a conical surface with the apex thereof directed toward said ion beam generating means, said surface being provided with a hole in the axis of said cone for the passage therethrough of said first beam, and an annular slot around said axis for the passage therethrough of said second beam.

10. A device as claimed in claim 3, wherein said first focusing means is formed by first magnetic field generating means producing lines of force essentially directed in the desired direction of said first beam, and wherein said second focusing means is formed by second magnetic field generating means producing a magnetic field having a strength substantially greater than the said first magnetic field and having lines of force essentially directed in the same direction.

11. A device as claimed in claim 1, further comprising means for imparting to the electrons in said electron beam essentially the same velocity as the velocity of the ions in said ion beam.

12. A device as claimed in claim 11, wherein both electron and ion velocities are slightly different.

13. A device as claimed in claim 6, wherein said second beam is delivered from an annular slot in a disk-shaped electrode provided in the center thereof with a hole for the passage of said first beam.

14. A device as claimed in claim 13, wherein said first focusing means is formed by first field generating means producing lines of force essentially directed in the desired direction of said first beam, wherein said second focusing means is formed by second magnetic field generating means producing a magnetic field having a strength substantially greater than said first magnetic field and having lines of force essentially directed in the same direction, and wherein said diverging means for said first beam is constituted by third magnetic field generating means located between said first and second magnetic field generating means and producing a magnetic field having a strength substantially smaller than said first magnetic field and having lines of force essentially directed in the same direction.

15. A particle confining device comprising an evacuated vessel, means for generating ions having high energy including focusing means for focusing said ions substantially into a first beam, means for generating an electron flow including second focusing means for focusing said electrons substantially into a second beam substantially coaxial with said first beam, means for mixing said ions with said electron flow outside of said vessel to form plasma including deflecting means for deflecting at least one of said beams to direct the same towards the other of said beams and thereby mix the particles of both beams, means for injecting said plasma into said vessel, and means for confining said plasma within said vessel.

References Cited by the Examiner

UNITED STATES PATENTS

| | | | |
|---|---|---|---|
| 2,570,124 | 10/51 | Hernqvist | 315—111 XR |
| 2,627,034 | 1/53 | Washburn et al. | 313—230 XR |
| 2,636,990 | 4/53 | Gow et al. | |
| 2,798,181 | 7/57 | Foster. | |
| 2,831,996 | 4/58 | Martina. | |
| 2,880,337 | 3/59 | Langmuir et al. | 313—63 |
| 2,883,580 | 4/59 | Kilpatrick. | |
| 2,920,234 | 1/60 | Luce. | |
| 2,920,235 | 1/60 | Bell et al. | 176—2 |
| 2,928,966 | 3/60 | Neidigh | 313—230 XR |
| 2,961,559 | 11/60 | Marshall | 176—8 |
| 2,975,277 | 3/61 | Von Ardenne | 313—231 XR |
| 2,978,580 | 4/61 | Von Ardenne | 313—230 XR |
| 3,005,767 | 10/61 | Boyer et al. | |
| 3,014,154 | 12/61 | Ehlers et al. | 315—111 |
| 3,076,112 | 1/63 | Wasserman | 250—41.9 |
| 3,116,433 | 12/63 | Moncrieff-Yeates | 315—111 XR |
| 3,120,470 | 2/64 | Imhoff et al. | 176—5 |

FOREIGN PATENTS 656,398  8/51  Great Britain.

OTHER REFERENCES

Nuclear Instruments and Methods, vol. 4 (1959), No. 5, June 1959, pages 376–381.

Proceedings of the 2nd U.N. International Conference on the Peaceful Uses of Atomic Energy, Sept. 1–13, 1958, vol. 32, U.N. Geneva 1958, pages 256–264.

CARL D. QUARFORTH, *Primary Examiner.*

ROGER L. CAMPBELL, REUBEN EPSTEIN,
*Examiners.*